United States Patent
Morrison et al.

(10) Patent No.: US 10,114,141 B2
(45) Date of Patent: Oct. 30, 2018

(54) SUBSURFACE RESISTIVITY MODELING WITH ELECTROMAGNETIC FIELDS USING A CONDUCTIVE CASING

(71) Applicant: GroundMetrics, Inc., San Diego, CA (US)

(72) Inventors: H. Frank Morrison, Berkeley, CA (US); Clifford J. Schenkel, Concord, CA (US); Andrew D. Hibbs, La Jolla, CA (US)

(73) Assignee: GroundMetrics, Inc., San Diego, CA (US)

( * ) Notice: Subject to any disclaimer, the term of this patent is extended or adjusted under 35 U.S.C. 154(b) by 38 days.

(21) Appl. No.: 15/120,334

(22) PCT Filed: Feb. 20, 2015

(86) PCT No.: PCT/US2015/016831
§ 371 (c)(1),
(2) Date: Aug. 19, 2016

(87) PCT Pub. No.: WO2015/127211
PCT Pub. Date: Aug. 27, 2015

(65) Prior Publication Data
US 2017/0068015 A1    Mar. 9, 2017

Related U.S. Application Data

(60) Provisional application No. 61/942,940, filed on Feb. 21, 2014.

(51) Int. Cl.
*G01V 3/20*   (2006.01)
*G01V 3/08*   (2006.01)
(Continued)

(52) U.S. Cl.
CPC ............... *G01V 3/20* (2013.01); *G01V 3/08* (2013.01); *G01V 3/18* (2013.01); *G01V 3/26* (2013.01)

(58) Field of Classification Search
CPC ... G01V 3/20; G01V 3/26; G01V 3/08; G01V 3/18
See application file for complete search history.

(56) References Cited

U.S. PATENT DOCUMENTS

| 5,563,513 A * | 10/1996 | Tasci ................. G01V 3/02 324/359 |
| 6,393,363 B1 | 5/2002 | Wilt et al. |

(Continued)

FOREIGN PATENT DOCUMENTS

| WO | WO 2012/177349 | 12/2012 |
| WO | WO 2014/004777 | 1/2014 |

(Continued)

OTHER PUBLICATIONS

Kong et al, "*Casing Effects in the Sea-To-Borehole Electromagnetic Method*", Geophysics, vol. 74, No. 5, Sep.-Oct. 2009, pp. F77-F87.
(Continued)

*Primary Examiner* — Ajay Ojha
(74) *Attorney, Agent, or Firm* — Diederiks & Whitelaw, PLC (57) ABSTRACT

A method for efficiently calculating a subsurface distribution of electrical resistivity or conductivity generated by an electromagnetic (EM) source is provided wherein a significant fraction of the electric current produced by a source flows along a casing of a borehole. The method is comprised of two steps: calculating EM fields produced by the casing in the background lithology; and calculating EM fields caused by a resistivity anomaly in the presence of an EM
(Continued)

field produced by the casing within a subsurface or survey model that does not include the casing.

23 Claims, 5 Drawing Sheets (51) Int. Cl.
*G01V 3/18* (2006.01)
*G01V 3/26* (2006.01)

(56) References Cited

U.S. PATENT DOCUMENTS

| | | | |
|---|---|---|---|
| 6,603,314 | B1 | 8/2003 | Kostelnicek et al. |
| 9,611,736 | B2* | 4/2017 | Marsala .................. E21B 49/00 |
| 2011/0181701 | A1 | 7/2011 | Varslot et al. |
| 2012/0293179 | A1 | 11/2012 | Colombo et al. |

FOREIGN PATENT DOCUMENTS

| WO | 2014/026116 | 2/2014 |
|---|---|---|
| WO | WO 2014/039618 | 3/2014 |

OTHER PUBLICATIONS

Cuevas, N. "Casing effect in borehole-surface (surface-borehole) EM fields." In *74th EAGE Conference and Exhibition incorporating EUROPEC 2012*. 2012.

Wang, Tsili, John A. Stodt, Donald J. Stierman, and Larry C. Murdoch. "Mapping hydraulic fractures using a borehole-to-surface electrical resistivity method." *Geoexploration* 28, No. 3-4 (1991): 349-369.

\* cited by examiner

SUBSURFACE RESISTIVITY MODELING WITH ELECTROMAGNETIC FIELDS USING A CONDUCTIVE CASING

CROSS-REFERENCE TO RELATED APPLICATIONS

The present application represents a National Stage application of PCT/US2015/016831 entitled "Electromagnetic Fields Using a Conductive Casing" filed Feb. 20 2015, pending, which claims the benefit of U.S. Provisional Application Ser. No. 61/942,940 entitled "Method for Rapid Calculation of the Electromagnetic Field Produced by Transmitter with a Deep Surface Antenna" filed Feb. 21, 2014, both of which applications are incorporated herein by reference.

BACKGROUND OF THE INVENTION

The present invention relates to methods for determining the subsurface distribution of electrical resistivity or conductivity, via measurements of an electromagnetic (EM) field at the surface. More particularly, the method relates to surface EM fields that are generated by an EM source which is configured such that a significant fraction of the electric current produced by the source flows along the casing of a borehole.

The embodiments described herein relate generally to EM soundings within the earth based upon electric currents and the resulting electric and magnetic fields produced by those currents. As used herein, "earth" generally refers to any region of the subsurface or in which a borehole may be located including, for example, the lithosphere. In addition, measurements in accordance with the invention can be based on one or more components of the EM field, such as an electric field component. Furthermore, it should be recognized that the electric current flows, at least in part, along a casing of the borehole and can also flow along other conducting elements including, but not limited to, additional casings, well tubing, push rods, conducting fluids, and the like, associated with the borehole.

EM geophysical soundings probe electrical resistivity in the earth as a function of depth, where "earth" generally refers to any region in the subsurface, including, for example, the lithosphere. Typical targets of interest include ore bodies, hydrocarbons, water, steam, carbon dioxide, proppants, hydraulic fracture (fracking) fluids, salts, other substances injected into the ground to improve the effectiveness of geophysical soundings, and environmental pollutants. Since the resistivities of such targets and the surrounding medium may be quite dissimilar, it is possible to discriminate between them by measuring their subsurface resistivities when subjected to an electromagnetic field. Using this methodology, the depth, thickness, and lateral extent of materials of interest can be determined.

While EM geophysical soundings, or equivalently EM geophysical surveys, have historically been performed with an EM source on the surface of the earth, a borehole can provide physical access to the subsurface. Electrically coupling a geophysical transmitter to the earth via a borehole provides a way to produce EM fields within the earth at desired depths with less attenuation than if the source fields originated from a source at the surface of the earth.

Figure 1:
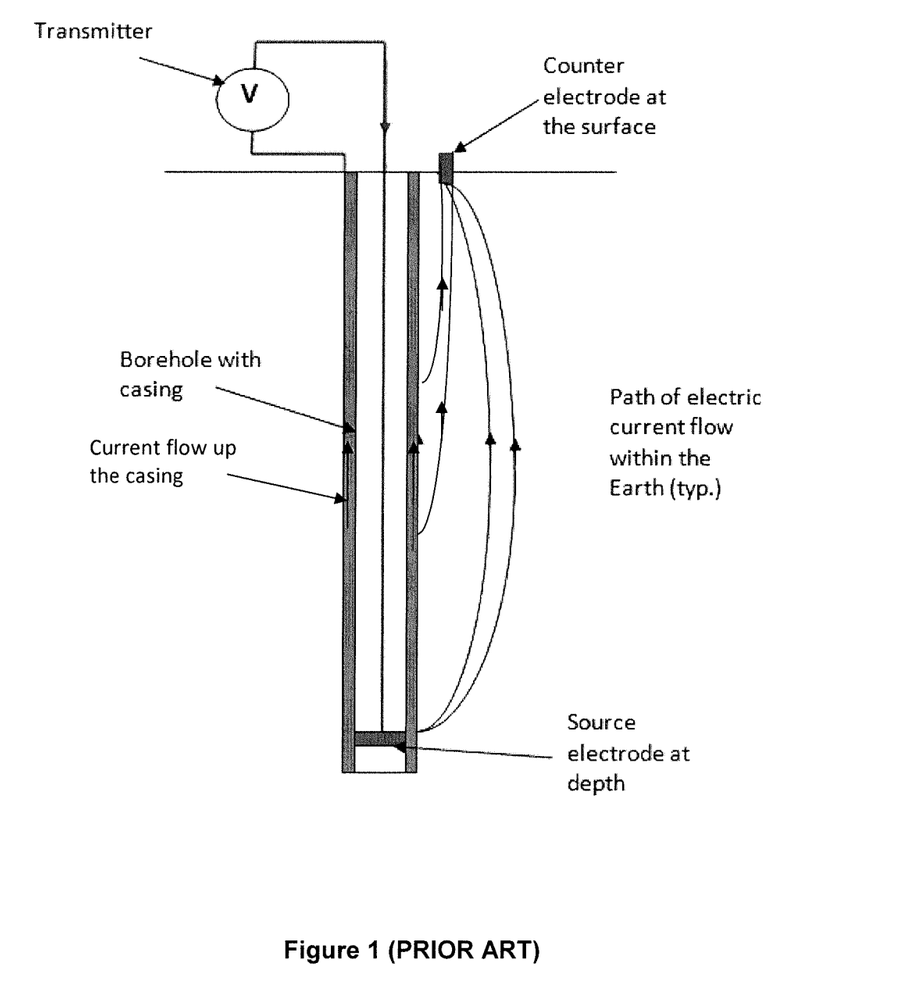
FIG. 1 is a known configuration of a borehole to surface electromagnetic configuration with a source electrode at depth within a borehole and counter electrodes at the earth's surface adjacent to the borehole, with exemplary paths of current flow in the earth and casing being shown.

A new commercial sounding configuration is the Borehole to Surface EM (BSEM) method. FIG. 1 illustrates the current practice comprising an electrode at depth within a borehole, termed the source electrode, and an electrode at the ground surface disposed near to the well that acts as a counter electrode. A transmitter produces a voltage that induces an electric current to flow between the source and counter electrodes. However, the direction of current flow is in general oscillatory, and it is equally true to say the current flows into the ground from the counter electrodes and out via the source. A surface array of receivers measures the EM fields induced by the source.

Figure 2:
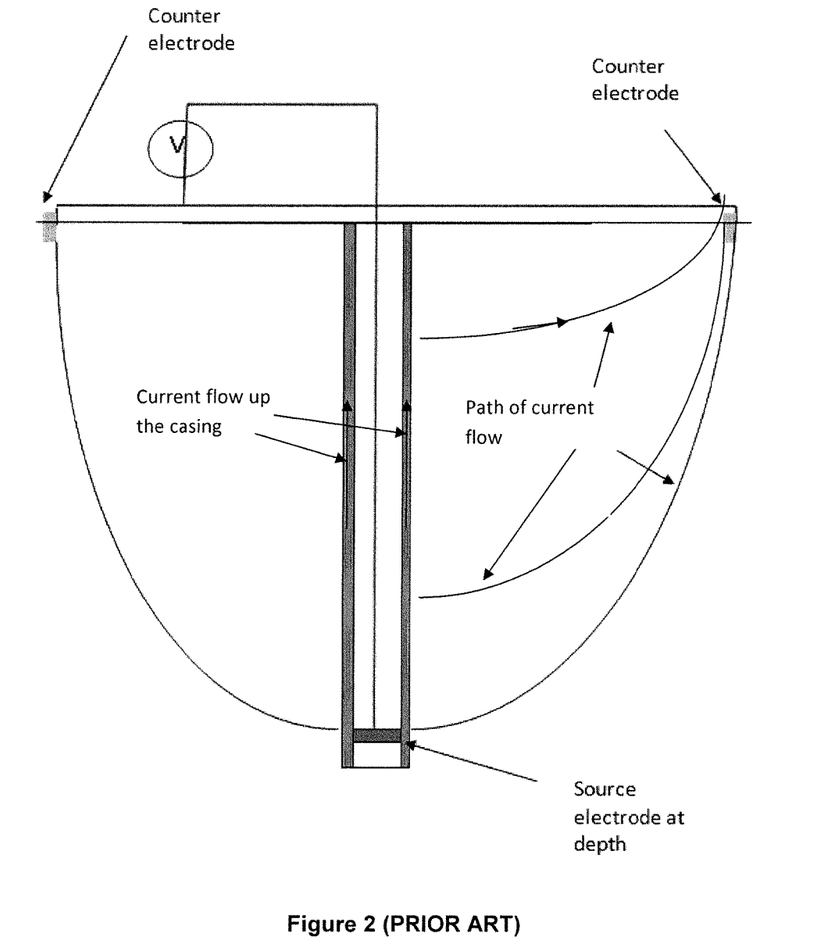
FIG. 2 represents another known borehole configuration including a source electrode at depth in a borehole and multiple counter electrodes located at a significant lateral offset distance along the earth's surface.

An advance described in a recently filed International Patent Application PCT/US12/39010 titled "System and Method to Measure or Generate an Electrical Field Downhole" by Hibbs and Glezer, involves locating a number of counter electrodes at a distance from the well comparable to the depth of the source electrode, and at least not less than 10% of the borehole depth. As illustrated in FIG. 2 of the present application, the subsurface current is forced to flow laterally through the ground (i.e., orthogonal to a vertical borehole) by a distance at least equal to the radial distance between the source and counter electrodes. This configuration increases the current flowing in the ground at formation depth and at large lateral offset from the borehole.

Figure 3:
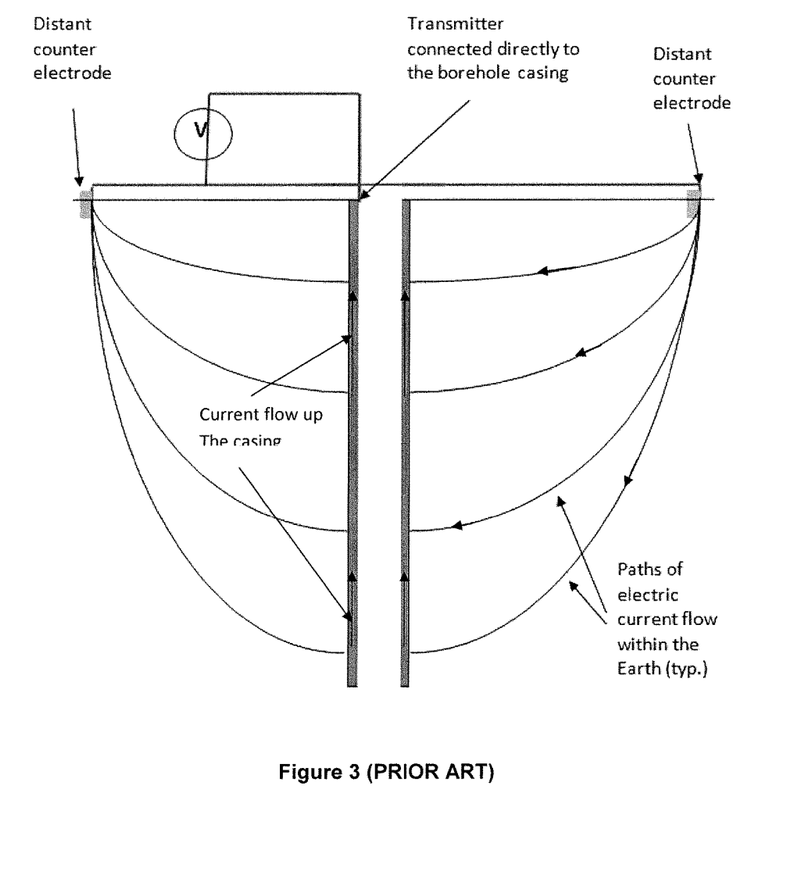
FIG. 3 illustrates a known depth to surface source configuration wherein an electrical connection is made at or near a top of a casing of a borehole and multiple counter electrodes are located at a significant lateral offset distance along the earth's surface.

A disadvantage of the BSEM method is that the borehole must be opened and a wireline is required to lower the source electrode to the desired depth. With this in mind, it has also been proposed, particularly in International Patent Application PCT/US2013/058158 titled "System and Method to Induce an Electromagnetic Field Within the Earth" by Hibbs and Morrison, to not employ a source electrode within the casing at depth, but rather drive the entire casing of the borehole at the desired voltage, V, by making an electrical connection at the top of the casing. Such an arrangement is represented in FIG. 3 of the present application. The top connection can also be implemented by an electrode in the ground near to the casing so that current flows through the earth from the near electrode to the top of the casing. For convenience, an EM source configuration comprised of a conducting well casing and a suite of surface counter electrodes of this type can be termed a Depth to Surface EM (DSEM) source.

In the BSEM and DSEM source configurations shown in FIGS. 1-3, a significant fraction of the total transmitted current flows in the casing. However, even for a uniform casing, the amount of electric current in the casing is not constant along its length. In the configuration shown in FIG. 1, electric current is emitted from the casing into the earth at the bottom of the casing, where the internal source electrode is located, and also emitted into the earth along the entire length of the casing. In the configuration shown in FIG. 2, electric current flows into the earth at the bottom of the casing and also from along the entire length of the casing. When contact is made to the top of the casing or near the top of the casing as in FIG. 3, current flows from the earth into the casing along its entire length, causing the total current in the casing to increase along the casing towards the current collection point.

Historically, the presence of conducting casings in boreholes has been considered a problem for surface EM surveys (for which all equipment is deployed at the ground surface), and such surveys have been arranged to avoid placing sources or receivers close to casings. For the recently introduced BSEM method illustrated in FIG. 1, the majority of commercial surveys have been conducted in uncased wells, thereby eliminating the question of current flow in the casing. However, the great majority of boreholes are completed with electrically conducting casing. Furthermore, the DSEM configuration shown in FIG. 3 requires a conducting casing. Therefore, it is of significant practical and commercial benefit to be able to utilize EM data collected via a source that utilizes a cased well.

Figure 4:
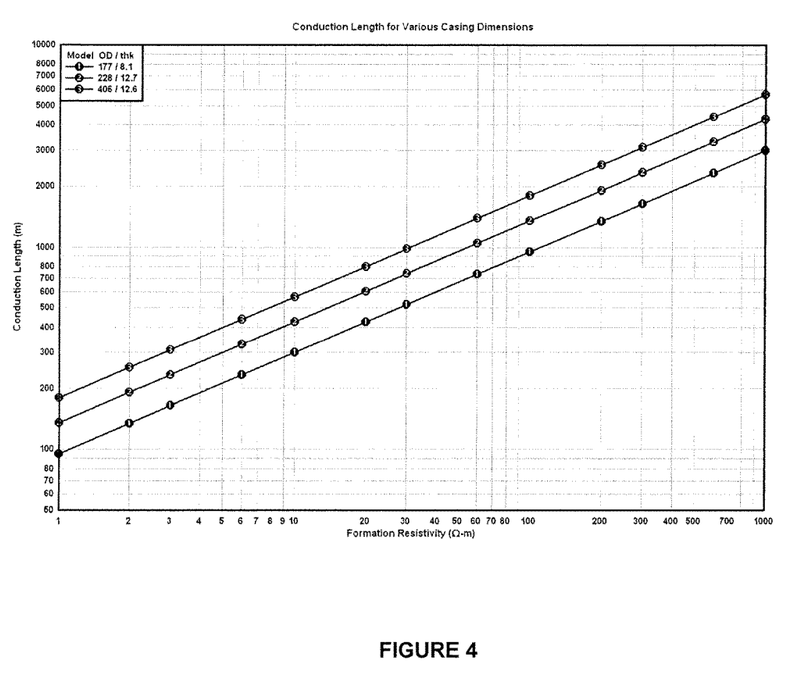
FIG. 4 is a graph showing casing conduction length vs. formation resistivity for three standard steel casings in a homogenous half space, with casing diameters (OD) and thickness (thk) given in millimeters, and casing conductance being $1\times10^6$ S/m.

For the arrangements of FIGS. 1-3, the current flow along the casing varies with depth due to the competing paths of a current flowing along the casing and current leaking radially off the casing. Analysis shows that, for uniform earth, the variation current along the casing is exponential of the form $e^{-z/\sqrt{\rho_f S_c}}$. Here z is the distance along the casing (e.g. the depth), $\rho_f$ is the formation resistivity and $S_c$ is a kind of casing conductance given by $S_c = \pi D t \sigma_c$ where D, t and $\sigma_c$ are the diameter, thickness and conductivity respectively of the casing. The distance at which the current leaving the casing has fallen to 1/e its value at the surface is given by $z = \sqrt{\rho_f S_c}$. In other words, ~63% of the current has leaked into the formation at a distance $z_{cl}$ where $z_{cl} = \sqrt{\rho_f S_c}$. For convenience, we term $z_{cl}$ the conduction length. As an example, the plot of FIG. 4 shows the conduction length or depth vs. formation resistivity for three standard steel casings. In practice, the formation resistivity $\rho_f$ varies within the earth, and so the conductance length itself varies with depth.

EM soundings are used to detect electrical resistivity (or equivalently electrical conductivity anomalies) in the subsurface. The underlying physics are that a change in the resistivity of a region compared to the background causes a change in the path of subsurface current flow. This change in subsurface current results in a change in the distribution of EM fields at the earth's surface. Calculating the change in field is complicated by the interaction between electric and magnetic fields. In general, an inhomogeneity, represented by an object of finite volume with a different resistivity from that of the background medium, is situated in the medium in the presence of the primary field produced by the source. There are two effects produced, i.e., a changing magnetic field induces currents in the object that are in addition to the primary field current, and the primary field currents in the medium are channeled into the object if it is more conductive than the background and diverge around it if it is more resistive. These induced and channeled currents then act as sources of secondary or anomalous magnetic and electric fields that are detected as anomalous fields at the receivers. For a given source configuration, the secondary EM fields depend on the induction number ($\eta$) of the inhomogeneity, which is given by the product of the conductivity ($\sigma$) frequency (f) and the square of a characteristic dimension ($\eta \sim \sigma f R^2$). At low induction numbers the secondary induced field is small whereas, at high induction numbers, there may be strong induced fields, although they decay very quickly away from the source due to skin depth effects.

For these reasons, calculating the field change due to an electrical inhomogeneity in the earth requires very substantial computational time and resources. Furthermore, there is no unique transformation connecting a given distribution of measured EM fields at the earth's surface to a specific distribution of subsurface inhomogeneities. In practice, the best that can be done is to iteratively calculate the subsurface resistivity distribution that best matches the expected geology and measured surface field distribution. This lack of a unique inverse solution considerably increases the computational requirements.

In the real world, the distribution of subsurface resistivity is not uniform, but varies, specifically with depth. For some applications, the variation of formation resistivity is known at discrete points, via well logs for example. In other scenarios, the background resistivity variation must be estimated from other geologic data. To incorporate such variation into a mathematical model, it is necessary to divide the subsurface region of the model into a large number of discrete subvolumes (voxels) connected via their boundaries. The resistivity of each voxel is then set corresponding to its location and whether it is assigned to represent the background medium or is part of an inhomogeneity. EM problems have now been modeled with up to approximately 1 billion voxels. The current distribution within the voxels is solved via integral or differential equations constrained by the voxel boundaries using methods known to those skilled in the art.

A considerable practical challenge in using voxel based methods is to limit the total number of voxels while being able to represent effects occurring over small length scales. For example, modeling a region of extent 5 km×5 km×2 km with voxels of 10 m requires 50 million voxels, but the model is unable to represent features that vary on scales smaller than 10 m. For EM problems for which the shape of boundaries affects the secondary fields that are produced, this limitation on spatial resolution can have a significant effect on the calculated fields.

The thickness of a typical casing is approximately 1 cm, which is much smaller than the smallest voxel used in a conventional EM model of the subsurface. One way to try to address this disparity in length scales between the dimension of a casing (e.g., 1 cm) and the scale of the subsurface model (e.g., 500,000 cm) is to vary the voxel size so that it is smaller within the casing, as well as in the region around the casing, and larger elsewhere. This approach of course increases the number of voxels required. Dividing a 10 m radius volume around a 2000 m long casing into 1 cm voxels adds approximately 6 billion voxels to the subsurface model. A further challenge is that the current density in the casing is still 1 million to 1 billion times higher than in the earth, no matter how big the voxels are made.

Accordingly, there is a need to develop a practical method to compute the subsurface current flow and resulting EM fields produced in the earth by a casing that is either used as part of an EM source or even just transmit current from a source based on interference with the EM fields. This method should be applicable regardless of the particular arrangement of source and counter electrodes (e.g., the arrangements of FIGS. 1-3) and should not, by itself, limit the extent of the subsurface region that can be modeled.

SUMMARY OF THE INVENTION

The invention provides for a method for efficiently calculating a subsurface distribution of an electrical parameter, particularly resistivity or conductivity, generated by an electromagnetic (EM) source wherein a significant fraction of an electric current produced by the source flows along a casing of a borehole. The method is essentially comprised of two steps: first calculating EM fields produced by the casing in the background lithology; and, second, calculating EM fields caused by a resistivity anomaly in the presence of an EM field produced, at least in part, by the casing within a survey model that does not include the casing.

In a preferred embodiment, the method for calculating the subsurface distribution relies on electromagnetic fields from a source that utilizes a conducting well casing located below an earth surface and includes: calculating a primary electromagnetic field produced by the well casing (with the primary electromagnetic field possibly being created between multiple well casings); representing the well casing within a subsurface model with an equivalent electromagnetic source embedded in the subsurface model; and calculating the electromagnetic fields produced by the equivalent electromagnetic source at locations where the electromagnetic fields are measured. The well casing is removed from the subsurface model, and the equivalent electromagnetic source is located where the casing was located. An anomaly (e.g., a hydrocarbon reservoir, produced by a process of hydraulic fracturing or established by an injected fluid or gas such as at a depth of greater than 1 km, preferably greater than 1.5 km and most preferably greater than 2 km) is present within the subsurface model. The primary electromagnetic field can be created between multiple well casings and is represented as an electric field, particularly a DC field and the equivalent electromagnetic source is one or more current dipoles or a series of potential values, preferably distributed along an axis where the well casing was located. The equivalent electromagnetic source can have a time dependent component.

Additional objects, features and advantages of the invention will become more readily apparent from the following detailed description and the accompanying drawings.

DETAILED DESCRIPTION OF THE INVENTION

In a typical electromagnetic (EM) survey, such as used in BSEM and DSEM, the EM field produced at the surface by the EM source is measured by an array of receivers typically separated by 50 to 100 m and generally distributed over an area of 0.5 km² to 10 km². To prevent the source from saturating the receivers, the receivers are rarely deployed closer than 50 m from the casing. To model the effect of a casing, an approximation is made in accordance with the invention in which, because of the large conductivity difference between natural formations within the earth and the conductivity of the casing, the secondary field produced by an anomaly at distance from the casing produces a negligible effect on the current distribution in the casing. This approximation is equivalent to saying the primary field produced by a casing at a resistivity anomaly within the earth does not depend on the nature of that anomaly.

By means of this approximation, a casing can be modeled first as an isolated conductor in a resistive medium, without including electrical anomalies that may be present within the earth. The earth is modeled using the known distribution of electrical resistivity, or a representative approximation of the electrical resistivity distribution derived from current or historical data. This is termed the background or subsurface model.

The combination of the source electrodes, casing and background model are used to illuminate the subsurface resistivity anomaly, or anomalies. The conditions and solution that lead to the calculation of the primary field is referred to as the casing model. The primary EM field can be represented as an electric field, with electric currents and magnetic fields produced by that field determined by electromagnetic relationships known to those skilled in the art; as a magnetic field, with the associated electric fields and electric currents being derived by established methods; or as any equivalent electromagnetic field variable, such as the vector potential.

Generally, the subsurface anomaly is the feature targeted by the EM sounding. For example, targeted anomalies could include a body of bypassed or undiscovered oil, the distribution of the oil to water contact in an oil reservoir, a plume of injected $CO_2$ or steam, a boundary of gas and oil in a formation, or the penetration of water, brine or proppants into a hydraulic fracture, or the injection of conductive tracers or markers. However, the anomaly could also be an unexpected feature that is identified by the EM survey, for example, a region of hydrocarbons at an unexpected location within the survey volume or an unexpected escape of an injected fluid. In general, an anomaly is thus a distinct region of the subsurface having a different resistivity from the background geology.

One or more properties of the subsurface anomaly may be known in advance, such as the range of its value of electrical resistivity or some aspect of its spatial extent. For example, it may be confined within a certain range of depths. The goal of the sounding is to acquire more information about the anomaly, typically its precise physical location, lateral extent or resistivity. The anomaly may be spatially complex, such as the distribution of oil water contact in a reservoir where "fingering" has taken place. With this in mind, an anomaly could be considered to be the sum of multiple individual anomalies. Alternatively, there may be multiple anomalies present within a given survey volume. Further, anomalies may be anticipated and/or discovered as a result of the sounding. There may be cases where a sounding is done with the expectation of no anomalies and no anomalies are found, thereby confirming the integrity of subsurface infrastructure for example.

For the purposes of this invention, an anomaly can be considered as a subsurface feature that requires a model containing a substantial number of voxels in order to calculate its effect on the primary field at certain measurement locations. For example, a small or complex volume at depth within a simple background model, or a larger volume present in a complex background model comprised of many layers. In each case, a large number of voxels, more than 20,000, and generally more than 1,000,000, are needed to render the anomaly within the background model. In general, the background or survey model has at least more than 10,000 voxels, preferably more than 200,000 voxels, and even greater than 10,000,000 voxels.

Regardless of the specific nature of the anomaly, or anomalies, that may be present in range of the fields produced by the casing, the primary field, which is the EM field produced by the casing, is calculated in isolation of the anomalies. Once this is done, the primary field is used as the input to a model that includes the features that the sounding seeks to illuminate. This model is termed the survey model. The survey model thus includes the background model and the anomaly, but does not include the casing.

Figure 5:
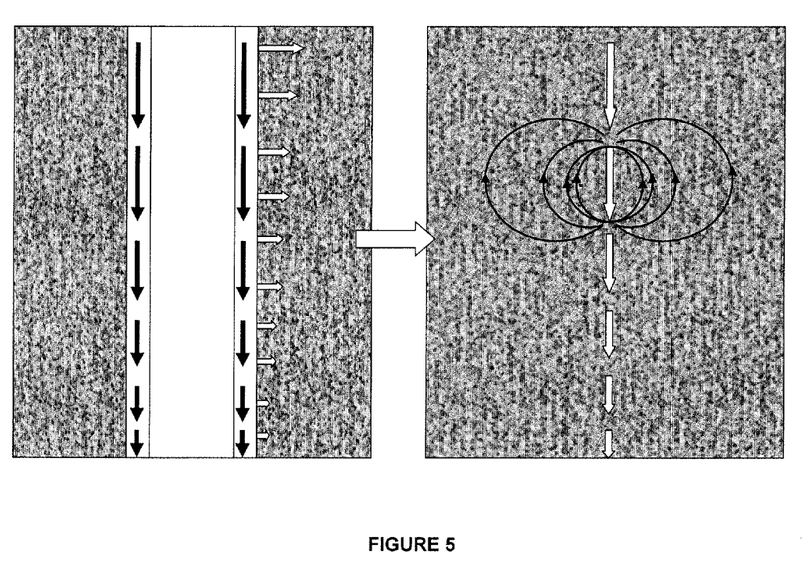
FIG. 5 illustrates a conducting casing carrying an electric current (left) as a series of equivalent current dipoles in the host medium (right). The current in the casing is shown by the black arrows and varies along the length of the casing due to current flow from the casing into the medium which is illustrated by white horizontal arrows. On the right side, the current flowing in the medium for one of the equivalent dipoles is illustrated by the black curved lines.

A particular way of representing the casing found to be of significant utility in performing calculations of practical complexity is to represent the primary field produced by the casing by a series of current dipoles. Specifically, the region of the model where the casing is present in reality is rendered as a region of the natural formation that would be there in the absence of the borehole and casing, but containing a series of current dipoles, oriented along the axis of the casing, which are equal in magnitude to the current that was present in the casing. This is illustrated in FIG. 5.

A particular way to apply the equivalent current dipoles within the survey model is to run the survey model with only a single equivalent current dipole present and run the survey model once for each equivalent current dipole, each time calculating the EM fields at the locations of interest resulting from that dipole, and then sum the surface fields for each equivalent dipole to determine the total field. By this method of equivalent current dipoles, the primary field produced by an EM source that utilizes a casing of a borehole can be rapidly calculated. As noted, the high conductivity of the casing means that the secondary fields produced by subsurface anomalies have negligible effect on the current distribution within the casing. Thus, the primary fields produced by the source in the earth where the casing is located can be decoupled from the unknown details of the subsurface. This decoupling allows the overall inversion process to be faster and less expensive.

In accordance with another embodiment, instead of calculating the current dipoles, the voltage distribution along the casing and tangentially from the casing into the earth can be calculated and used as part of the starting conditions for the process that calculates the measured fields of the electrical anomaly. If desired, a combination of both current and voltage can be provided by the casing solution and passed to the anomaly solution.

This method of representing the current flowing in a casing is valid regardless of the specific orientation of the borehole. Thus, the invention is not restricted to either straight or vertical boreholes, but can be implemented in any borehole including angled or horizontal boreholes and variants of horizontal boreholes such as "fish bone" configurations or any combination thereof. The specific geometry of the borehole can be accommodated in an inversion model used to relate the surface fields to the subsurface resistivity distribution.

In addition, the solution of the background model and survey model can be further separated. It is found that, for most natural lithologies, the distribution of current or voltage along the casing is determined by the conduction length, with little correction for non-zero frequency at the range of frequencies used in practical soundings. Thus, the EM solution for this sounding model can be calculated by using a casing model calculated at DC, and then modeling the primary field using the DC amplitudes from the casing model with a time variation as used in the actual survey. This separation of the problem into a DC casing model and an AC survey model further reduces the processing time and expense.

Although described with reference to the preferred embodiments of the invention, it should be readily understood that various changes and/or modifications can be made to the invention without departing from the spirit thereof. For instance, although the invention has been described in connection with only a single borehole, it is within the scope of the invention to use other casings as part of the source current path. In addition, other casings can be present in the earth but not used as part of the source. When such other casings are present, their effect on the subsurface fields can be modeled by methods known to those skilled in the art. Furthermore, as mentioned above, the casing of concern need not be part of the current source but rather transmit current based on interference with generated EM fields. Finally, as indicated above, the electric current does not need to flow solely along a casing of the borehole but can additionally flow along other conducting elements including, but not limited to, additional casings, tubing, push rods, conducting fluids, and the like, associated with the borehole.

The invention claimed is:

1. A method for conducting an electromagnetic survey of subsurface targets of interest by calculating AC electromagnetic fields below an earth surface comprising:
    modeling the earth below the earth surface using a known distribution of electrical resistivity, or a representative approximation of the electrical resistivity distribution derived from current or historical data, to form a subsurface model;
    transmitting current from a source, at least in part, along a conducting casing of a borehole to produce a primary electromagnetic field, said field being a DC electric field;
    calculating the primary electromagnetic field produced by the casing to determine a casing model and then create an equivalent electromagnetic source based on the casing model;
    representing the casing within the subsurface model with the equivalent electromagnetic source embedded in the subsurface model, wherein the casing is removed from the subsurface model and the equivalent electromagnetic source is located where the casing was located;
    calculating the AC electromagnetic fields produced by the equivalent electromagnetic source; and
    determining a depth, thickness or lateral extent of the target of interest based on the AC electromagnetic fields produced by the equivalent electromagnetic source.

2. The method of claim 1, wherein the electromagnetic fields are calculated at, or near to, the earth surface.

3. The method of claim 1, wherein the electromagnetic fields include at least one horizontal electric field radial to the casing.

4. The method of claim 1, wherein the equivalent electromagnetic source is one or more current dipoles.

5. The method of claim 4, wherein the equivalent electromagnetic source is a series of current dipoles distributed along an axis where the casing was located.

6. The method of claim 1, wherein the equivalent electromagnetic source is a series of potential values.

7. The method of claim 1, wherein the equivalent electromagnetic source is a series of potentials distributed along an axis where the casing was located.

8. The method of claim 1, wherein the equivalent electromagnetic source is a series of current dipoles distributed orthogonal to an axis where the casing was located.

9. The method of claim 1, wherein the primary electromagnetic field is a DC field and the equivalent electromagnetic source has a time dependent component.

10. The method of claim 1, wherein the primary electromagnetic field is a DC field, and the equivalent electromagnetic source is a current dipole having an amplitude determined from the DC field and a time dependent component determined by a waveform of the equivalent electromagnetic source.

11. The method of claim 1, further comprising: establishing the primary electromagnetic field between two well casings.

12. The method of claim 1, further comprising: including a resistivity anomaly which is a feature of the targets of interest within the subsurface model.

13. The method of claim 12, wherein the targets of interest include a hydrocarbon reservoir produced by a process of hydraulic fracturing or established by an injected fluid, gas, proppant, tracer or marker.

14. The method of claim 12, wherein the resistivity anomaly is at a depth of greater than 1 km, preferably greater than 1.5 km and most preferably greater than 2 km.

15. The method of claim 1, wherein the subsurface model has more than 10,000 voxels, preferably more than 200,000 voxels, and even greater than 10,000,000 voxels.

16. The method of claim 1, further comprising: individually calculating an effect of each electromagnetic source in a survey model and totaling the electromagnetic field at each measurement location by summing the effects of all sources.

17. The method of claim 1, further comprising: employing a borehole to surface electromagnetic sounding configuration.

18. The method of claim 1, further comprising: employing an electrode at depth within the borehole and distant counter electrodes at the earth surface as a sounding configuration.

19. The method of claim 1, further comprising: employing a connection at or near a top of the borehole and distant counter electrodes at the earth surface as a sounding configuration.

20. The method of claim 1, wherein calculating the primary electromagnetic field produced by the casing includes calculating an electric current distribution along an axis of the casing.

21. The method of claim 20, wherein representing the casing within the subsurface model by the equivalent electromagnetic source includes representing the casing within the subsurface model by a set of equivalent current dipoles embedded at the location where the casing was located.

22. The method of claim 21, further comprising, prior to calculating the electromagnetic fields produced by the equivalent electromagnetic source, calculating a current flow caused by the set of equivalent current dipoles in the subsurface model considering a presence of subsurface inhomogeneities.

23. The method of claim 22, wherein calculating the electromagnetic fields produced by the equivalent electromagnetic source includes calculating the electromagnetic field at the surface that is caused by the current flow in the subsurface model including the presence of the subsurface inhomogeneities.

* * * * *